US007116524B2

(12) United States Patent
Buske et al.

(10) Patent No.: US 7,116,524 B2
(45) **Date of Patent: *Oct. 3, 2006**

(54) SERVO TRACK WRITER WITH ACTUATOR VIBRATION ISOLATION

(75) Inventors: Lon Richard Buske, Apple Valley, MN (US); Rodney Dale Dahlenburg, Minneapolis, MN (US); Joel Daniel Phillips, Burnsville, MN (US); William John Raphael, Mustang, OK (US); Thomas Henry Sexton, Maple Grove, MN (US); Mark August Toffle, St. Louis Park, MN (US); Brent Melvin Weichelt, Burnsville, MN (US); Jason Paul Zimmerman, Faribault, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 10/756,877

(22) Filed: Jan. 13, 2004

(65) Prior Publication Data

US 2004/0145833 A1 Jul. 29, 2004

Related U.S. Application Data

(63) Continuation of application No. 10/039,011, filed on Jan. 2, 2002, now Pat. No. 6,900,968.

(60) Provisional application No. 60/295,275, filed on Jun. 1, 2001.

(51) Int. Cl.
*G11B 5/55* (2006.01)

(52) U.S. Cl. .................................................... 360/265.2

(58) Field of Classification Search ............. 360/265.2
See application file for complete search history.

(56) References Cited

U.S. PATENT DOCUMENTS 5,469,315 A * 11/1995 Sanada .................... 360/265.5
5,761,006 A * 6/1998 Sri-Jayantha et al. .... 360/265.2

* cited by examiner

*Primary Examiner*—A. J. Heinz
(74) *Attorney, Agent, or Firm*—Fellers, Snider, et al.

(57) ABSTRACT

An actuator assembly and method for orienting a head over a disc within a multi-disc servo-track writer incorporates an actuator block, rotational air bearing, translational air bearing, adaptor plate, E-block and actuator arm/head assembly. Rotation of the E-block, and hence actuator arm/head assembly, is directly controlled by the movement of the rotational air bearing, which is rotated by a motor. The air bearing provides for reduced friction and, as a result, decreased eccentricity of the head as compared to related art configurations. A translational air bearing laterally positions the actuator assembly within the multi-disc servo-track writer for servo-track recording.

12 Claims, 9 Drawing Sheets

SERVO TRACK WRITER WITH ACTUATOR VIBRATION ISOLATION

RELATED APPLICATIONS

This application is a continuation of U.S. patent application Ser. No. 10/039,011, filed on Jan. 2, 2002 now U.S. Pat. No. 6,900,968, which claims priority of U.S. Provisional Application Ser. No. 60/295,275, filed Jun. 1, 2001.

FIELD OF THE INVENTION

This application relates generally to magnetic disc drives and more particularly to an actuator assembly having a gas bearing for accurately positioning transducers during servo-pattern recording.

BACKGROUND OF THE INVENTION

Disc drives are data storage devices that store digital data in magnetic form on a rotating storage medium on a disc. Modem disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator or actuator arm for movement of the heads relative to the discs. Transducers are used to transfer data between a desired track and an external environment. During a write operation, sequential data is written onto the disc track and during a read operation, the head senses the data previously written onto the disc track and transfers the information to the external environment. Important to both of these operations is the accurate and efficient positioning of the head relative to the center of the desired track. Head positioning within a desired track is dependent on head-positioning servo-patterns, i.e., a pattern of data bits used to maintain optimum track spacing and sector timing. Servo-patterns can be recorded between the data sectors on each track of a disc, termed embedded servo, or on one dedicated surface of a disc within the disc drive, termed dedicated servo.

Servo-patterns are typically recorded on a target disc during the manufacturing of the disc drive, by a servo-track writer (STW) assembly. There are basically two conventional methods for recording servo-pattern onto a disc for use in a disc drive. In one method, an STW assembly is attached to a disc drive having a disc pack and read/write heads mounted in their proper positions. The mounted disc on the disc pack has not been pre-recorded with servo-pattern. The STW assembly attaches to the assembled disc drive and, using the actual drive's read/write heads, records the requisite servo-pattern directly to the mounted disc. Alternatively, and potentially more cost effectively, servo-pattern can be recorded onto a plurality of disc prior to the discs being mounted into a disc drive assembly. In this method, a multi-disc servo-track writer, having dedicated read/write heads or servo-recording heads records the servo-pattern onto each disc. One or more discs are simultaneously prepared within the dedicated apparatus, allowing for the high throughput output of servo ready discs. The prerecorded discs are then assembled into the drives.

Recent efforts within the disc drive industry have focused on developing cost effective disc drives capable of storing more data onto existing or smaller sized disc surfaces. One potential way of increasing data storage on a disc surface is to increase the recording density of the disc surface by increasing the track density (tracks per millimeter (tpmm)). Increased track density requires more closely spaced, narrow tracks, which in turn requires increased accuracy in recording servo-pattern onto the target disc surface. This increased accuracy requires that servo-track recording be accomplished within the increased tolerances, but remain cost effective.

Dedicated multi-disc servo-track writers have traditionally utilized servo-recording heads that are positioned on a target disc surfaces by pivoting and rotation in a radial path across the disc. The rotation of each head is typically accomplished by pivoting of an E-block within the writer, where the E-block rotates on ball bearings. Ball bearings, although effective for some existing devices, have limitations as to how precisely the servo-recording head can be position on a disc surface. For example, ball bearings often suffer from lobing, due to imperfections in the roundness of the ball bearings or smoothness of the races, which results in unwanted vibration in the servo-recording heads during servo-track recording. In addition, ball bearings suffer from a fair level of eccentricity, thereby adding a level of uncertainty as to the exact rotational movement and position of the servo-recording heads in relation to the axis of rotation. These imperfections in the manner in which the servo-recording heads are position result in an unacceptable level of accuracy, especially in light of the trend toward higher track density, cost effective, discs.

There has been a long felt but unrecognized need, in high density servo-track writing, for a mechanism to orient servo-recording heads in a substantially vibration-free manner, simultaneously maintaining a low eccentricity in their movements. Such a mechanism would allow for more accurate and cost effective recording of servo-patterns to disc surfaces and thereby allow for increases in disc track densities beyond present technology limitations. Against this backdrop the present invention has been developed.

SUMMARY OF THE INVENTION

Embodiments of the present invention include an apparatus and method for reducing eccentricity in a rotary actuator positioning a read/write head over a disc within a multi-disc servo-track writer (MDW). One embodiment of the present invention is a multi-disc track writer for recording information on one or more data storage discs. The writer may include an actuator assembly with an actuator block having a cavity therein and a rotational gas bearing housed within the cavity for supporting an E-block having one or more elongated actuator arms each carrying a data transducer.

The actuator assembly preferably has a translational gas bearing formed on a bottom face of the actuator block operable when moving the actuator assembly over a platform surface between a first servo-recording position and a second disc loading and unloading position. A slide mechanism can be used for laterally moving the actuator block on a gas cushion provided by the translational gas bearing between the first and second positions. The actuator assembly rotational gas bearing can have a rotatable spindle and an adaptor plate fastened between the rotatable spindle of the rotational gas bearing and an E-block assembly carrying the transducers.

Another embodiment of the present invention is a method for positioning a servo-recording head over a disc in a multi-disc track writer. The method includes the steps of:

(a) applying gas pressure to a translational gas bearing on a bottom face of the actuator block to provide a float between the actuator assembly and the platform;
(b) laterally moving the actuator assembly on the translational gas bearing to a servo-recording position;
(c) removing the gas pressure from the translational gas bearing;
(d) pulling a vacuum on the translational gas bearing to immobilize the actuator assembly against the platform surface in the servo-recording position;
(e) applying gas pressure to a rotational gas bearing in the actuator block, the rotational gas bearing supporting the servo-recording head; and
(f) rotating the servo-recording head on the rotational gas bearing.

These and various other features as well as advantages which characterize the present invention will be apparent from a reading of the following detailed description and a review of the associated drawings.

DETAILED DESCRIPTION

Figure 1:
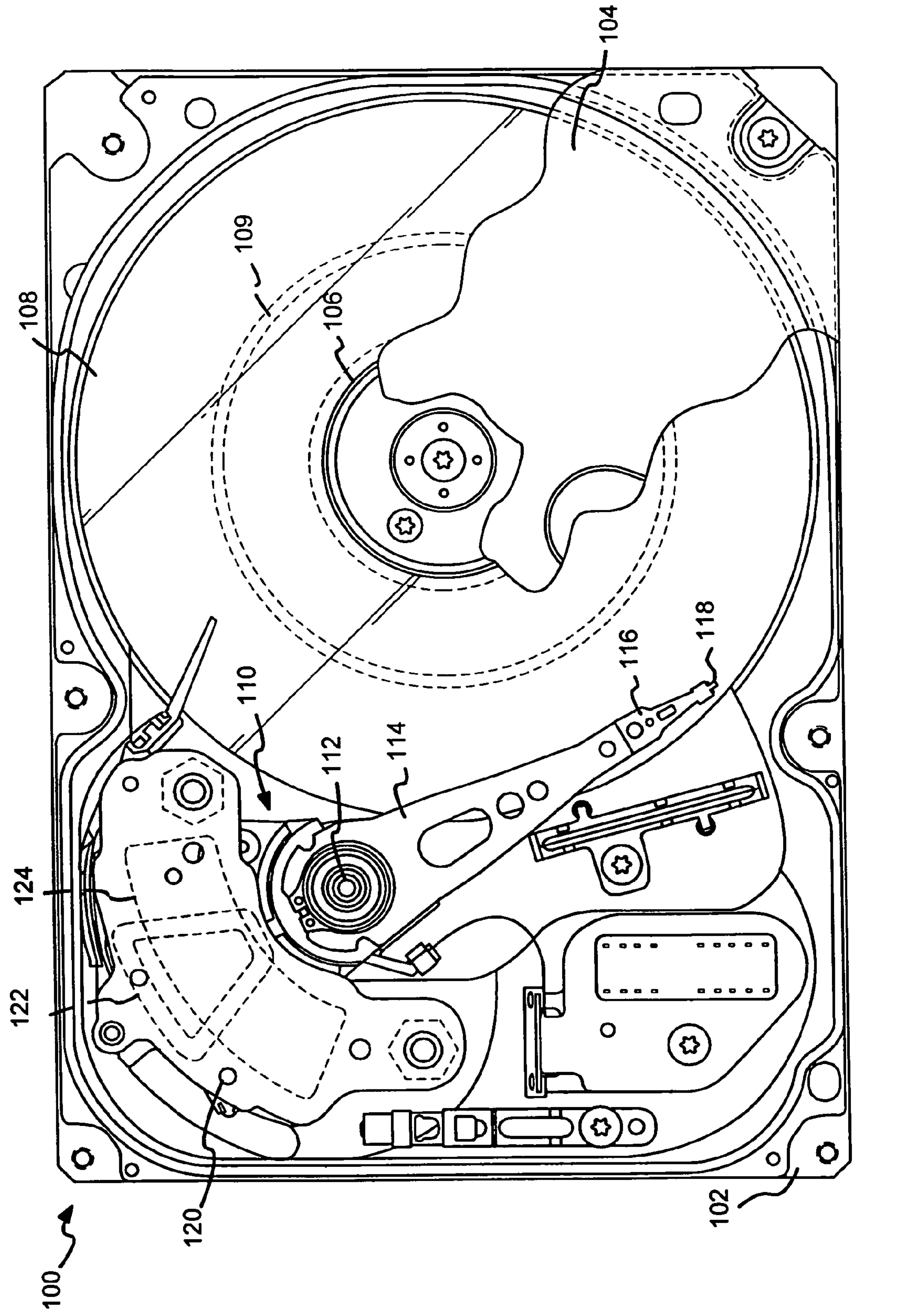
FIG. 1 is a plan view of a disc drive having a disc prepared using an embodiment of the present invention.

A disc drive 100 having a disc manufactured in accordance with the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106 that rotates one or more discs 108 at a constant high speed. Information is written to and read from tracks, as illustrated by broken line 109, on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of the flexures 116 is a head 118 that includes an air bearing slider (not shown) enabling the head 118 to fly in close proximity above the corresponding surface of the associated disc 108. The head 118 includes a writing element, i.e., write head, to record information to the disc 108 and a reading element, i.e., read head, to transfer data from the disc 108 to the host computer (not shown).

The radial positioning of the heads 118 is controlled through the use of a voice coil motor 120, which typically includes a coil 122 attached to the actuator assembly 110, as well as one or more permanent magnets 124, which establish a magnetic field in which the coil 122 is immersed. The controlled application of current to the coil 122 causes a magnetic interaction between the permanent magnets 124 and the coil 122 so that the coil 122 moves in accordance with the well-known Lorentz relationship. As the coil 122 moves, the actuator assembly 110 pivots about the bearing shaft assembly 112 and the heads 118 are caused to move across the surfaces of the discs 108.

Proper orientation of the heads 118 over the disc surface relies upon pre-recorded servo-patterns on the disc. The present invention provides a method for recording servo-pattern to a disc 108 as well as an actuator assembly 134 having a pair of air bearings (see below) for the accurate positioning and movement of servo-recording heads during servo-pattern recording on a disc. Typically, servo-pattern is recorded onto disc 108 during the manufacture of the disc drive 100. A dedicated servo writing apparatus, termed a multi-disc servo-track writer 136, can be used to record servo-pattern onto the disc surfaces. These discs are then assembled into disc drives 100 during the manufacturing process of a number of discs 108 simultaneously.

Figure 2:
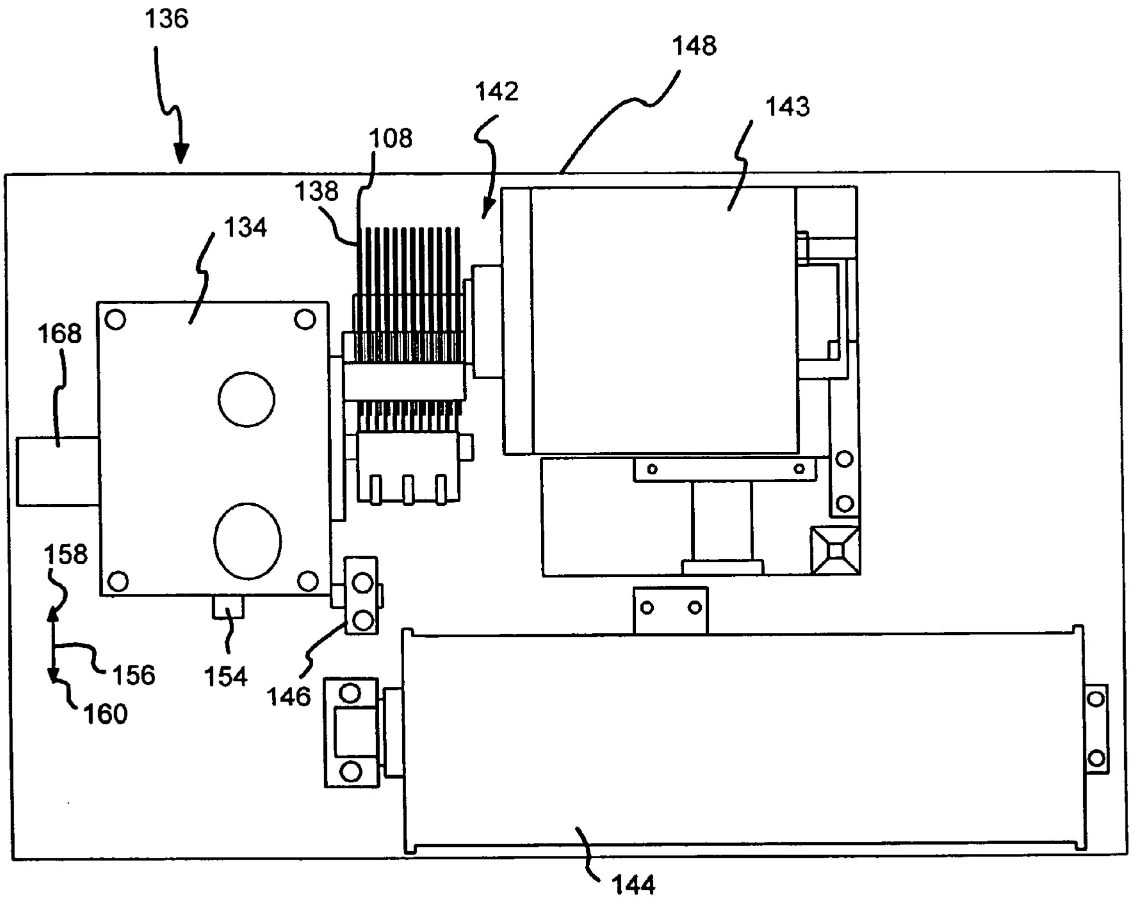
FIG. 2 is a schematic plan view of a multi-disc servo-track writer (MDW) incorporating an actuator assembly in accordance with an embodiment of the present invention.
Figure 3:
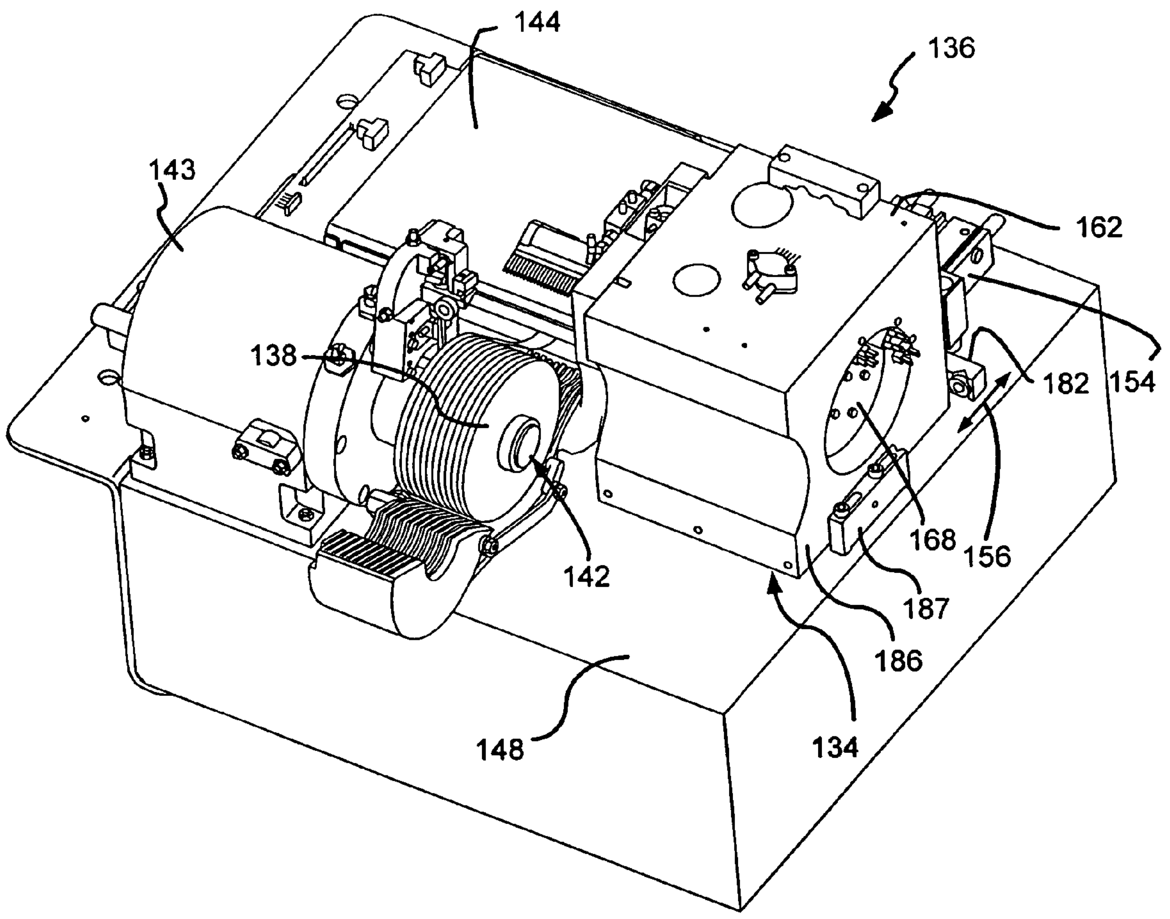
FIG. 3 is a perspective view of the MDW in FIG. 2.

FIGS. 2–8 illustrate an actuator assembly 134 in a multi disc servo-track writer 136 in accordance with an embodiment of the present invention. FIGS. 2 and 3 show one potential multi-disc servo-track writer 136 for use with the present invention. The multi-disc servo-track writer 136 includes an actuator assembly 134 for moving the servo-recording heads 140 (see FIGS. 3 and 7) necessary for recording servo-patterns onto a stack of target discs 108. A spindle hub assembly 142 attached to a spindle motor 143 vertically positions one or more target discs 108 onto which the servo-pattern is to be recorded. A vacuum chuck 144 rigidly secures the actuator assembly 134 in a desired position for servo-track writing and fastens the spindle hub assembly to the spindle motor 143. A laser transducer system 146 measures the angular displacement and consequent positioning of the servo-recording heads 140 of the actuator assembly 134 for servo-pattern recording. These components of the multi-disc servo writer 136 are fastened to a flat, rigid base or platform 148. The platform 148 is preferably a granite slab, as is shown in FIG. 3.

The accuracy of the servo-pattern recorded on a disc surface 138 relies upon, among other things, the vibration free positioning and movement of the servo-recording heads 140 over target disc 108 locations. Accurate positioning and vibration free movement of the servo-recording heads in turn depends upon the accurate movement positioning of the actuator assembly 134 in relation to the target discs 108 as well as the smooth, vibration free movements of the recording heads 140 over the disc surface 138, i.e., the heads move with reduced vibration and eccentricity over a target disc surface as compared to the conventional movement of servo-recording heads. Embodiments of the present invention provide an actuator assembly 134 for use in a multi-disc servo-track writer 136, having a translational air bearing 150 (see FIG. 4) for the lateral positioning of the actuator assembly 134 within the multi-disc servo-track writer 136, and a rotational air bearing 152 (see FIG. 4) for the rotation of the servo-recording head(s) 140 on the actuator assembly 134 over disc surfaces 138 within the multi-disc servo writer 136. The combination of air bearings 150 and 152 provides the actuator assembly 134 with enhanced positional accuracy, and the servo-recording heads 140 with reduced vibrational noise and eccentricity during servo-track recording.

Continuing to refer to FIGS. 2 and 3, the multi-disc servo-track writer 136 is secured to a flat surface of a substantially immobile platform 148. The actuator assembly 134 is connected to the platform 148 via a slide mechanism 154 for lateral movement of the actuator assembly 134, as indicated by arrow 156, over the platform 148 between a servo-recording position 158 and disc loading and unloading position 160. The actuator assembly 134 is shown in the disc unloading position in FIG. 3. The actuator assembly 134 is shown in the servo-recording position 158 in FIGS. 2 and 8.

The spindle motor hub assembly 142 and vacuum chuck 144 are both fastened to the platform 148. Note that the actuator assembly 134 and spindle hub assembly 142 are positioned in a head-to-head fashion for rotations about parallel horizontal axes. The spindle hub assembly 142 vertically positions one or more discs 108 for the simultaneous writing of servo-pattern onto each disc 108 by servo-recording heads 140 located on the actuator assembly 134 (see FIGS. 3 and 8). The vacuum chuck 144 is rigidly secured in proximity to the actuator assembly 134 to pull a vacuum on the translational air bearing 150 of the actuator assembly 134 and thereby secures the servo-recording position 158 or disc loading and unloading position 160.

In general, target discs 108 are assembled into a multiple disc pack that is mounted to the spindle motor hub assembly 142 where the actuator assembly 134 is moved laterally into position 158 for servo-recording. Servo-recording heads 140 on the actuator assembly 134 are rotated over the mounted disc surface 138 and servo-pattern recorded, the servo-recording heads 140 are rotated off of the disc surface 138, and the actuator assembly 134 moved laterally away from the mounted disc for unloading and use in a disc drive 100.

Figure 4:
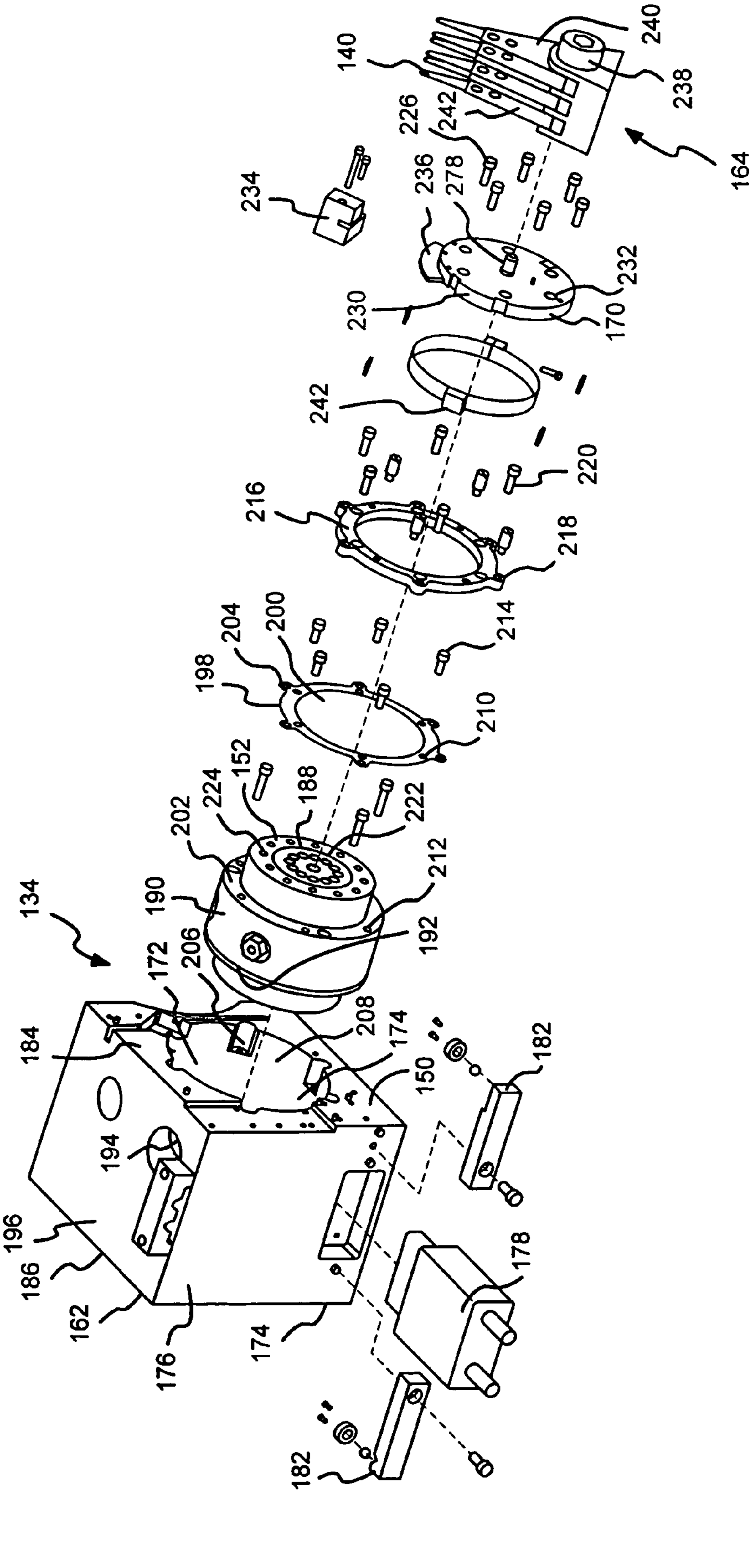
FIG. 4 is a separate perspective exploded actuator end view of the actuator assembly in FIG. 2 in accordance with one embodiment of the present invention.

An embodiment of the actuator assembly 134, in accordance with the present invention, is shown in FIG. 4. The actuator assembly 134 includes an actuator block 162 housing a rotational air bearing 152, a translational air bearing 150, an E-block assembly 164 that includes an E-block 166, a series of one or more actuator arms 240 carrying recording heads 140 thereon, a DC torque, brushless motor 168 (see FIG. 2) or like motor 246 (see FIGS. 3 and 5) for actuating the rotational air bearing 152, a sliding mechanism 154 for translational movement of the actuator block 162, and a laser transducer assembly 146 for coordinating the motor's movement with the servo-recording head's position. In preferred embodiments, the actuator assembly 134 also includes an adaptor plate 170 coupling the E-block assembly 164 to the rotational air bearing 152, as described in greater detail below.

With continued reference to FIG. 4, the actuator block 162 of the actuator assembly 134 has a generally cube-like shape housing having a cavity or chamber 172 for receiving the rotational air bearing 152 and associated DC torque, brushless motor 168 therein. The actuator block 162 defines two aligned circular-like openings, an opening 174 on the front face of the actuator block that faces toward the spindle hub motor assembly and a second opening (not shown) on the opposite or back face of the actuator block 162. The openings are of sufficient diameter to receive the rotational air bearing 152 and DC torque brushless motor. (See 168 in FIG. 2 or 246 in FIG. 5).

The slide mechanism 154 is used, in coordination with the translational air bearing 150, to laterally move the actuator assembly 134 over the base 148 toward and away from the spindle motor hub assembly 142. The slide mechanism 154 attaches to a lower edge 174 of a side face 176 of the actuator assembly 134, and preferably to a lower edge of the side face adjacent the vacuum chuck 144. The slide mechanism 154 includes a pneumatically sliding cylinder 178 attached to the platform 148 by a flexure or bracket 180. A pair of stops 182 extend along the lower edge 174 of the side face 176 of the actuator block 162 on opposite sides of the actuator block attached sliding mechanism. Each stop 182 extends beyond the front face 184 and back face 186 of the actuator block 162. A pair of catch block 187 is positioned on the platform 148 on opposite sides of the actuator block 162 to contact each stop when the sliding mechanism 154 laterally moves the actuator assembly 134 to the servo-recording position 158 on the platform.

The rotational air bearing 152 has an inner, freely rotatable spindle 188 contained within an outer, non-rotating race 190. The interface between the spindle 188 and outer race 190 provides a chamber (not shown) for receiving pressurized air, thereby creating a substantially frictionless air float, allowing the substantially frictionless rotation of the spindle 188 in relation to the outer race 190. This type of bearing can be generally categorized as a statically pressurized fluid bearing. For purposes of this description and meaning of the appended claims, the term "statically pressurized fluid bearing" means a type of bearing in which the bearing surfaces are separated by an external static pressure source, independently of any bearing rotation. This type of bearing is distinguishable from a dynamically pressurized fluid bearing in which the bearing surfaces are separated by pressurization created by a pumping action resulting from rotation of the bearing.

An air port 192 in the outer race 190 provides communication between an external air source (not shown) and the chamber (not shown) formed between the spindle 188 and outer race 190. The air port 192 extends outwardly from the outer race 190 and fits through an opening 194 in the top surface 196 of the actuator block 162. One conventional rotational air bearing that may be used in the present invention is manufactured by Precision Instruments, Inc.

A doughnut shaped first clamp 198 having a central aperture 200 fits on the front end 202 of the outer race 190 of the rotational air bearing 152 and receives the inner spindle 188 through its central aperture 200. A series of semi-circular rings 204 extend from the outer surface of the first clamp 198 to align with bores 206 cut into the chamber wall 208 of the actuator block 162. A series of retaining holes 210 are equidistantly placed around the clamp 198 to align with bores 212 in the front end of the outer race of the rotational air bearing. Screws 214 or other like means are used to secure the first clamp 198 to the front end 202 of the outer race 190 of the rotational air bearing 152 utilizing the aligned bores 210 and 212. The outwardly extending rings 204 on the first clamp 198 align with the bores 206 cut into the chamber wall of the actuator block. A second doughnut shaped clamp 216 fits over the first clamp 198 having outwardly extending rings 218 that align over the rings 204 of the first clamp 198 and over the corresponding bores 206 in the chamber wall of the actuator block 162. Bolts 220 or other means are threaded through the rings of the second 218 and first 198 clamp thereby securing the rotational air bearing 152 within the actuator block chamber 172, where the font end 222 of the spindle 188 extends to the circular opening in the actuator block's front face 184. It is envisioned that the rotational air bearing 152 could be secured with the actuator block 162 in any number of ways, all of which are considered to be within the scope of the present invention.

The front face 222 of the spindle 188 of the rotational air bearing 152 defines a series of equidistantly spaced holes 224 which receive screws 226 or bolts used to secure the disc spaced adaptor plate 170 onto the rotational spindle 188. The adaptor plate 170 is secured to and rotates with the rotational air bearing spindle 188. A threaded stud 228 extends horizontally from the center of the adaptor plate, the stub aligned with the rotational air bearing axis of rotation, and receives and secures an E-block assembly 164 (see below). Between the centrally located stud 228 and outer circumference 230 of the adaptor plate 170, an alignment pin 232 extends for facilitating the orientation of the E-block assembly 164 during installation on the adaptor plate 170. In addition, a corner cube 234, used to communicate the adaptor plate's angular displacement, is held on the adaptor plate 170 through glue or a retainer/pin arrangement 236 as shown in FIG. 4.

As previously mentioned, the E-block assembly 164 is positioned on the stud 228 and alignment pin 232 located on the front face of the adaptor plate 170. An elongated bolt 238 attaches the E-block 164 to the adaptor plate 170 (see FIG. 7) so that actuator arms 240 extend in the vertical plane, or substantially perpendicular, to the rotational air bearing's axis of rotation, as indicated by line 242. Attached to the distal end of each actuator arm 240 of the E-block is a load beam assembly or two facing load beam assemblies, having associated servo-recording heads 140 thereon for servo-recording to the disc 108 located on the spindle motor hub assembly 142 (see FIG. 8).

Figure 5:
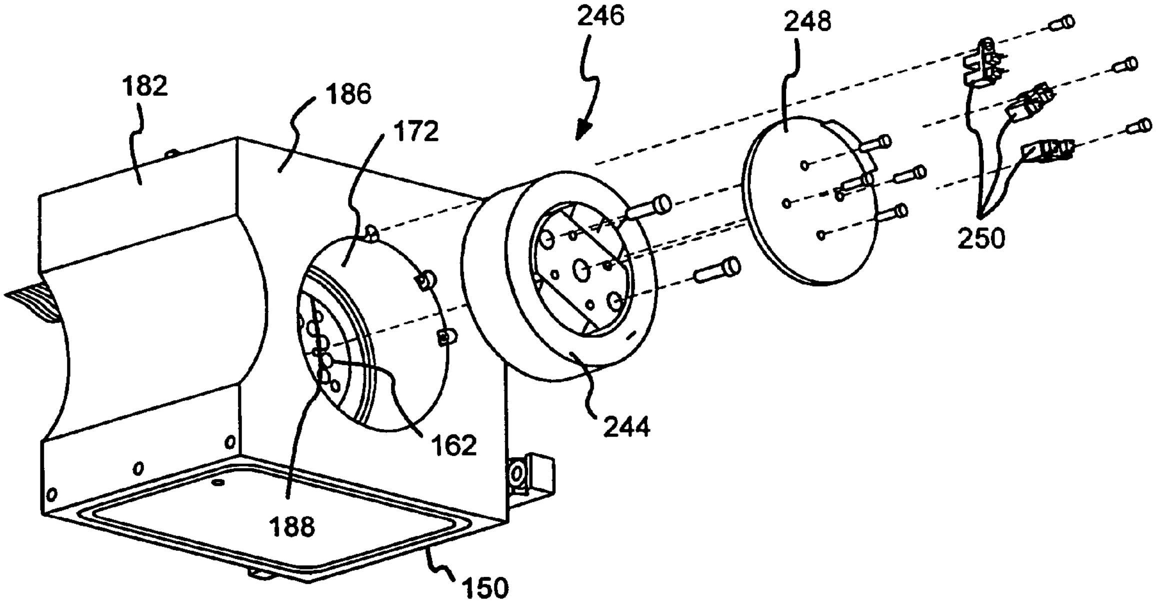
FIG. 5 is a perspective exploded rear view of the actuator assembly shown in FIG. 3.

FIG. 5 illustrates a perspective exploded view of the rear face 186 of the actuator block 162. A stator 244 of the DC torque, brushless motor 246 is glued adjacent the back end of the rotational air bearing 152 within the chamber 172. The stator 244 controls the rotational movement of the spindle 188 of the rotational air bearing 152 in conjunction with a trigger plate 248 and optical switches 250 as is well known in the art.

In use, actuation of the motor 246 causes a corresponding rotational movement of the rotational air bearing 152 about its axis of rotation 242, which causes the rotation of the E-block assembly 164 about the rotational air bearing axis of rotation 242. The rotational movement of the E-block assembly 164 about the rotational air bearing axis of rotation has a very small level of eccentricity and thereby provides for extremely accurate servo-recording head 140 positioning.

In addition, rotation about the air bearing 152 results in much lower levels of friction, especially as compared to conventional ball bearings, thereby providing for minimal levels of vibration during positioning of the servo-recording heads over the disc surfaces.

Figure 6:
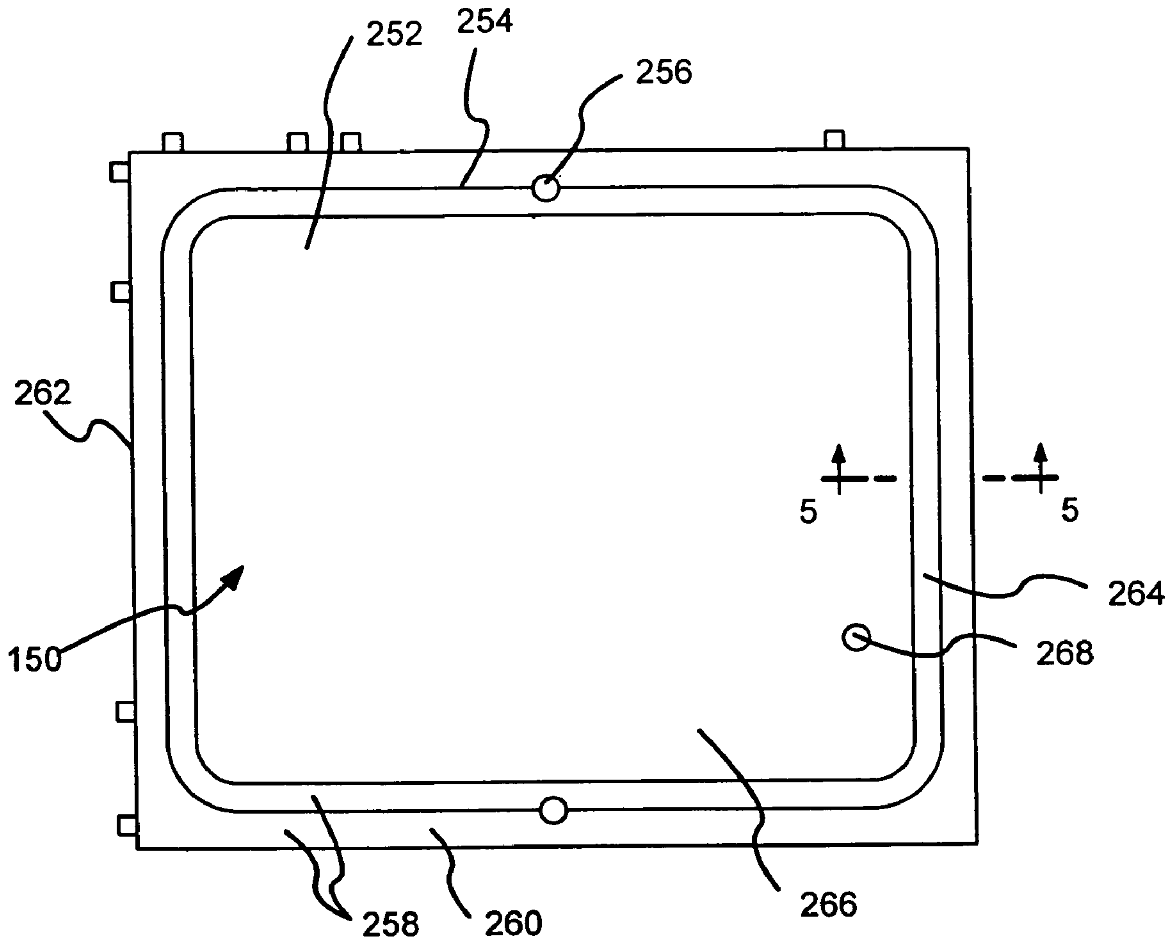
FIG. 6 is a bottom view of the actuator assembly shown in FIG. 4.
Figure 7:
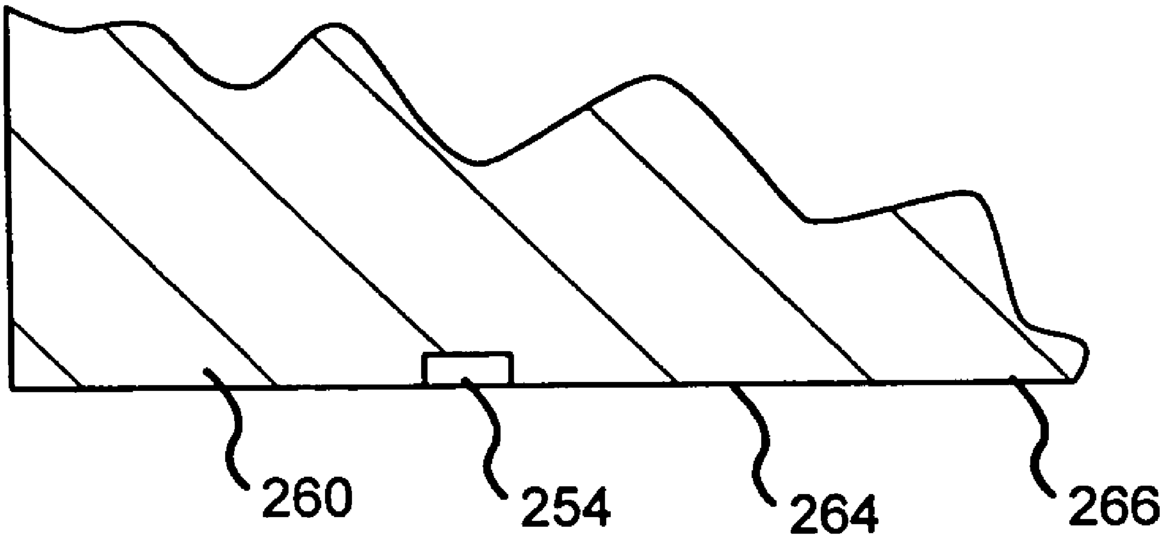
FIG. 7 is an enlarged cross-sectional view through the actuator block taken along line 5—5 in FIG. 6.
Figure 8:
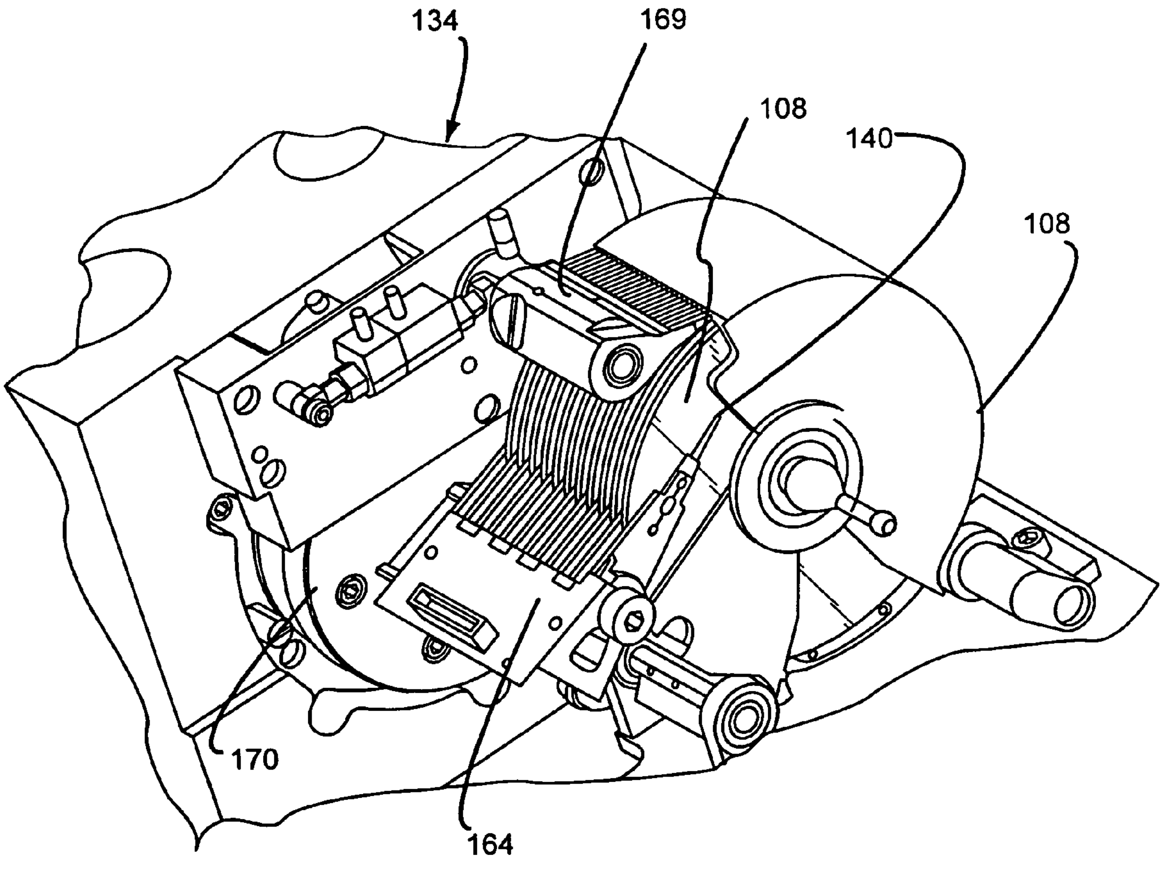
FIG. 8 is a close-up perspective view of the MDW above in FIG. 2 with disc pack on the spindle motor hub with the spindle motor removed in accordance with a preferred embodiment of the present invention.

As shown in FIGS. 6 and 7, the bottom face 252 of the actuator block 162 defines a translational air bearing 150. The translational air bearing 150 includes a groove 254 that extends around the periphery of the bottom face 252 of the actuator assembly, having two or more equally spaced air ports 256 for receiving pressurized air (not shown) into the groove. A planar landing 258 is on either side of the groove 254, where the two planar landings 258 are substantially parallel to each other and to the top surface of the platform 148. The first landing 260 extends from the groove 254 to the outer edge 262 of the bottom face 252 of the actuator assembly and the second landing 264 extends a uniform distance from the groove 254 until the start of a centrally located recess 266 within the bottom face of the actuator assembly. A vacuum port 268 is positioned within the recessed 266 bottom face of the actuator assembly.

The groove 254 in preferred embodiments of the present invention is preferably from 0.005 to 0.050 inches deep and is more preferably approximately 0.015 inches deep. The centrally located recess 266 in the bottom face 252 of the actuator assembly is preferably from 0.002 to 0.010 inches deep, and is more preferably approximately 0.005 inches deep. The shape of the groove 254 is preferably a square having rounded off corners. In use, when the actuator block 162 needs to be translationally moved over the platform 148, an air source (not shown) supplies pressurized air to the groove via ports 256. The pressurized air raises the actuator block 162 off the platform 148 and is substantially kept within both the grove 254 and within the recess 266 thereby providing a float between the bottom face 252 of the actuator block and the top surface of the platform 148. When the actuator block 162 needs to be secured in one of the desired positions on the platform, the pressurized air is removed and a vacuum applied to the bottom face of the actuator block by pulling a vacuum through the vacuum port 268 by the vacuum chuck 144. The co-planar landings 258 on either side of the groove 254 provide a substantially air tight connection between the actuator block and the platform.

Figure 9:
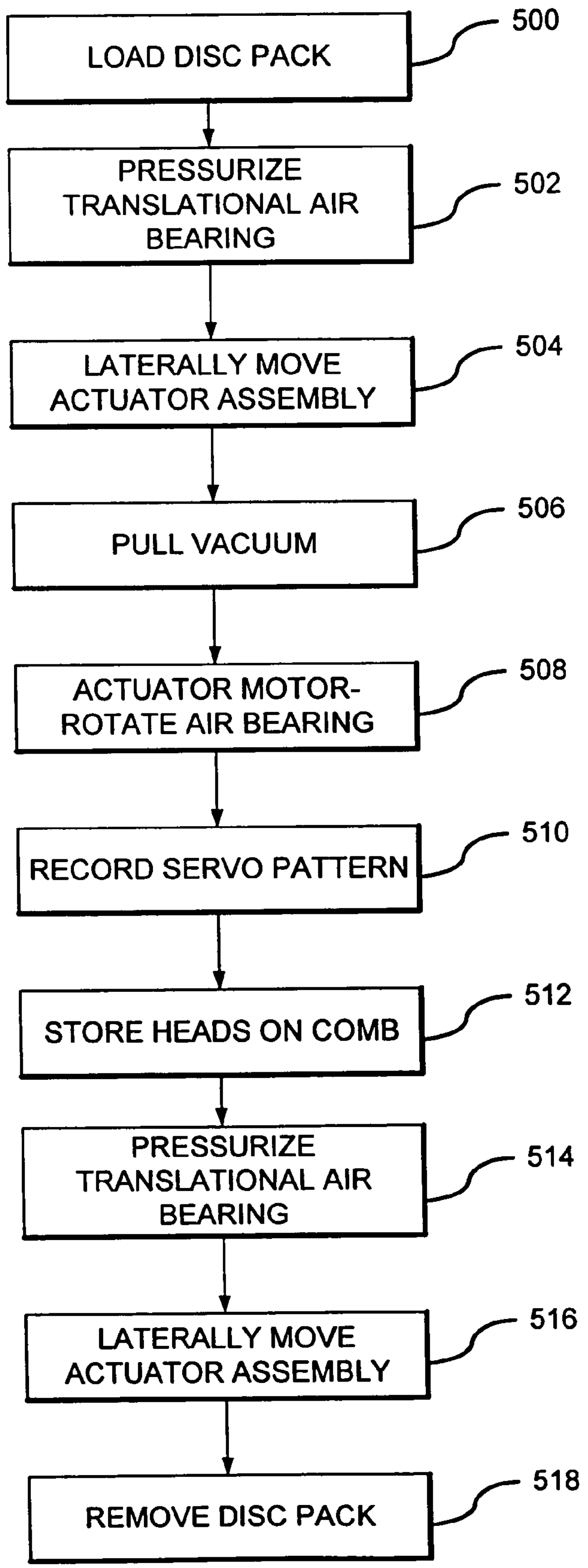
FIG. 9 is a process flow diagram of the steps for servo writing a disc pack in a servo-track writer in accordance with one embodiment of the present invention.

FIG. 9 is a process flow diagram showing the steps for positioning and rotating a servo-recording head in relation to a disc surface utilizing one embodiment of the present invention. In operation 500, a disc pack is loaded onto the multi-disc servo-track writer 136 for servo-track recording onto each disc 108. In operation 502, a satisfactory amount of air is applied to a translational air bearing in the actuator assembly 134 to provide a float between the actuator assembly 134 and the platform 148. In operation 504, a slide mechanism 154 that connects the actuator assembly to the platform 148 is actuated to laterally move the actuator assembly 134 into a servo-recording position. In operation 506, a vacuum chuck 144 pulls a vacuum on the actuator assembly 134 to secure the assembly in the required servo-recording position. In operation 508, a motor 168 is actuated to rotate the rotational air bearing 152 for unloading the servo-recording heads from a comb 169 and positioning the servo-recording heads 140 on the disc surfaces 138. In operation 510, a servo-pattern is recorded on each of the target disc surfaces. In operation 512, the servo-recording heads 140 are removed from the disc surfaces 138 upon completion of servo-pattern recording and stored back on the comb 169. In operation 514, air pressure is added to the translational air bearing 150 to re-establish the float between the actuator assembly 134 and the platform 148. In operation 516, the slide mechanism 154 laterally moves the actuator assembly 134 to a non-servo-pattern recording position and the disc stack is removed from the multi-disc servo-track writer 136. In operation 518, servo-recorded discs 108 are removed from the disc stack and installed into target disc drives such as disc drive 100.

In summary, an embodiment of the present invention may be viewed as an actuator assembly (such as 134) for use in a multi-disc track writer (such as 136) for recording information on one or more data storage discs (such as 108) that includes an actuator block (such as 162) having a central cavity therein (such as 172) and a rotational air bearing (such as 152) housed within the central cavity (such as 172) of the actuator block (such as 162) for supporting an E-block (such as 164) having one or more elongated actuator arms (such as 240) each carrying at a distal end thereof one or more transducers (such as 140) each for recording the information on a disc surface.

The actuator assembly (such as 134) has a translational air bearing (such as 150) formed on a bottom face (such as 252) of the actuator block (such as 162) operable when moving the actuator assembly over a platform surface (such as 148) between a first servo-recording position and a second disc loading and unloading position. A slide mechanism (such as 154) is used for laterally moving the actuator block (such as 162) on an air cushion provided by the translational air bearing (such as 150) between the first and second positions. The translational air bearing has a groove (such as 254) juxtaposed between two planar lands (such as 260 and 264) on the actuator block bottom face (such as 252) that extend around a centrally located recess (such as 266) in the bottom face (such as 252) of the actuator block (such as 162).

The actuator assembly (such as 134) rotational air bearing (such as 152) has a rotatable spindle (such as 188) and an adaptor plate (such as 170) fastened between the rotatable spindle (such as 188) of the rotational air bearing (such as 152). The adapter plate (such as 170) supports the E-block (such as 164). The rotational air bearing has an axis of rotation substantially parallel to the surface of the platform (such as 148). The actuator assembly (such as 134) has one or more elongated actuator arms (such as 242) oriented substantially perpendicular to the rotational air bearing axis of rotation and has a motor (such as 246) coupled to the rotational air bearing spindle (such as 188). A corner cube (such as 234) participates in providing positional information for controlling the motor (such as 246) to position the E block (such as 164) carrying the transducers (such as 140) over the disc surfaces. The actuator assembly also has a stop (such as 182) positioned on the actuator block adjacent the platform surface (such as 148) and a catch block (such as 187) extending from the platform (such as 148). The actuator assembly (such as 134), moving on the translational air bearing (such as 150), is positioned in the servo-recording position when the stop (such as 182) interacts with the catch (such as 187).

An embodiment of the present invention may alternatively be viewed as a method for positioning a servo-recording head (such as 118) over a disc (such as 108) in a multi-disc track writer (such as 136) wherein the servo-recording head (such as 140) is on an actuator assembly (such as 134) coupled to a platform (such as 148) surface by an actuator block (such as 162) and the disc (such as 108) is on a spindle hub (such as 142) coupled to a spin motor (such as 143) fastened to the platform surface. The method includes the steps of:

(a) applying gas pressure to a translational gas bearing (such as 150) on a bottom face (such as 252) of the actuator block (such as 162) to provide a float between the actuator assembly (such as 134) and the platform (such as 148);

(b) laterally moving the actuator assembly (such as 134) on the translational gas bearing (such as 150) to a servo-recording position (such as 158);

(c) removing the gas pressure from the translational gas bearing (such as 150);

(d) pulling a vacuum on the translational gas bearing (such as 150) to immobilize the actuator assembly (such as 134) against the platform surface in the servo-recording position (such as 158);

(e) applying gas pressure to a rotational gas bearing (such as 152) in the actuator block (such as 162), the rotational gas bearing supporting the servo-recording head (such as 140); and (f) rotating the servo-recording head (such as 140) on the rotational gas bearing (such as 152).

The translational gas bearing (such as 150) on the bottom surface (such as 252) of the actuator block (such as 162) has a groove (such as 254) juxtaposed between two planar landings (such as 258) that receives pressurized gas and that extends around a centrally located recess (such as 266) in the bottom face of the actuator block. The method further may include steps of:

(g) recording information on the disc (such as 108);

(h) rotating the servo-recording head (such as 140) off of the disc;

(i) removing the gas pressure from the rotational gas bearing (such as 152) in the actuator block (such as 162);

(j) applying gas pressure to the translational gas bearing (such as 150); and (k) moving the actuator block (such as 162) to a disc loading and unloading position (such as 160).

(l) removing the air pressure from the translational gas bearing (such as 150); and (m) pulling a vacuum on the translational gas bearing to immobilize the actuator assembly (such as 134) in the disc loading and unloading position (such as 160).

An embodiment of the present invention may also be viewed as an actuator assembly (such as 134) for recording information onto a disc surface in a multi-disc track writer (such as 136). The actuator assembly (such as 134) includes an E-block (such as 166) having one or more elongated actuator arms (such as 240), each actuator arm (such as 240) having a distally located recording head (140); and vibration-isolation means for rotating the E-block (such as 166) in the actuator assembly (such as 134) to position the recording heads (such as 140) over a disc (such as 108) surface. The vibration-isolating means for rotating the E-block is preferably a rotational air bearing (such as 152). The air bearing (such as 152) has a rotatable spindle (such as 188) fastened to the E-block assembly (such as 164). The actuator assembly (such as 134) also has a means for moving the actuator between a recording position (such as 158) and a disc loading and unloading position (such as 160). This means for moving the actuator includes a translational air bearing (such as 150) and a slide mechanism (such as 154) for moving the actuator assembly (such as 134) along a platform (such as 148) surface.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. An actuator assembly for recording information onto a disc surface in a multi-disc track writer, the actuator assembly comprising:

an E-block having one or more elongated actuator arms, each actuator arm having a distally located recording head; and means for rotating the E-block in the actuator assembly to position the recording heads over a disc surface.

2. The actuator assembly of claim 1 further comprising means for moving the actuator between a recording position and a disc loading and unloading position.

3. A track writing apparatus comprising:

an actuator assembly comprising a stationary actuator block having a cavity therein; and a rotational gas bearing comprising an outer race fixed to the actuator block and a rotatable inner spindle fixed in rotation with a head for storing data on the track.

4. The apparatus of claim 3 wherein the rotational gas bearing defines a gap between the outer race and the inner spindle adapted for containing a pressurized fluid supporting the inner spindle in a non-contacting engagement with the outer race.

5. The apparatus of claim 3 wherein the inner spindle is operably rotatable around an axis of rotation that is substantially perpendicular to a direction of gravitational force.

6. The apparatus of claim 5 wherein the heads are rotated around the inner spindle axis of rotation.

7. The apparatus of claim 3 further comprising a motor coupled to the inner spindle.

8. The apparatus of claim 7 further comprising a corner cube providing positional information for controlling the motor to position the heads.

9. A track writing apparatus comprising a pressurized fluid bearing supporting a data transfer head relative to a storage medium, the bearing configured to retain a pressurized fluid while maintaining the head in a stationary position.

10. The apparatus of claim 9 wherein the fluid bearing rotationally supports the data transfer head.

11. The apparatus of claim 10 wherein the fluid bearing comprises a fixed race in noncontacting engagement with a rotatable spindle.

12. The apparatus of claim 11 wherein the spindle operably rotates around an axis of rotation that is substantially perpendicular to a direction of gravitational force.

* * * * *